(12) United States Patent
Seol

(10) Patent No.: US 7,544,139 B2
(45) Date of Patent: Jun. 9, 2009

(54) MULTIFUNCTIONAL PEDALING MOTION BICYCLE

(75) Inventor: Marn Taek Seol, Kyung Gi-Do (KR)

(73) Assignee: Ok Yeo Chong, Seoul (KR)

( * ) Notice: Subject to any disclaimer, the term of this patent is extended or adjusted under 35 U.S.C. 154(b) by 580 days.

(21) Appl. No.: 11/281,479

(22) Filed: Nov. 18, 2005

(65) Prior Publication Data

US 2006/0183580 A1    Aug. 17, 2006

(30) Foreign Application Priority Data

Feb. 2, 2005    (CN) .................... 2005 2 0001872 U

(51) Int. Cl.
*F16H 59/001* (2006.01)
*F16H 27/02* (2006.01)
(52) U.S. Cl. ............................. 474/160; 474/1; 74/143; 74/594.1; 74/594.2; 280/253
(58) Field of Classification Search ................. 474/160; 74/143, 594.1, 594.2; 280/252, 253, 260, 280/261
See application file for complete search history.

(56) References Cited

U.S. PATENT DOCUMENTS 4,564,206 A * 1/1986 Lenhardt ..................... 280/252
5,088,340 A * 2/1992 Seol ............................. 74/143

* cited by examiner

*Primary Examiner*—Robert A Siconolfi
*Assistant Examiner*—San Aung
(74) *Attorney, Agent, or Firm*—Muncy, Geissler, Olds & Lowe, PLLC

(57) ABSTRACT

An improved multifunctional pedaling motion bicycle, particularly to a transmission mechanism of bicycle includes a clutch member that is manually controlled to move between and selectively engage primary and secondary control blocks to perform different modes of operation of the bicycle, including regular pedaling, independent pedaling of cranks, same-direction upward/downward movements of the cranks. The transmission mechanism has a simple and light-weighted structure and thus low cost and low failure risk with extended service life. Further, a variety of different operation modes can be performed without dedicated rear hub.

6 Claims, 16 Drawing Sheets

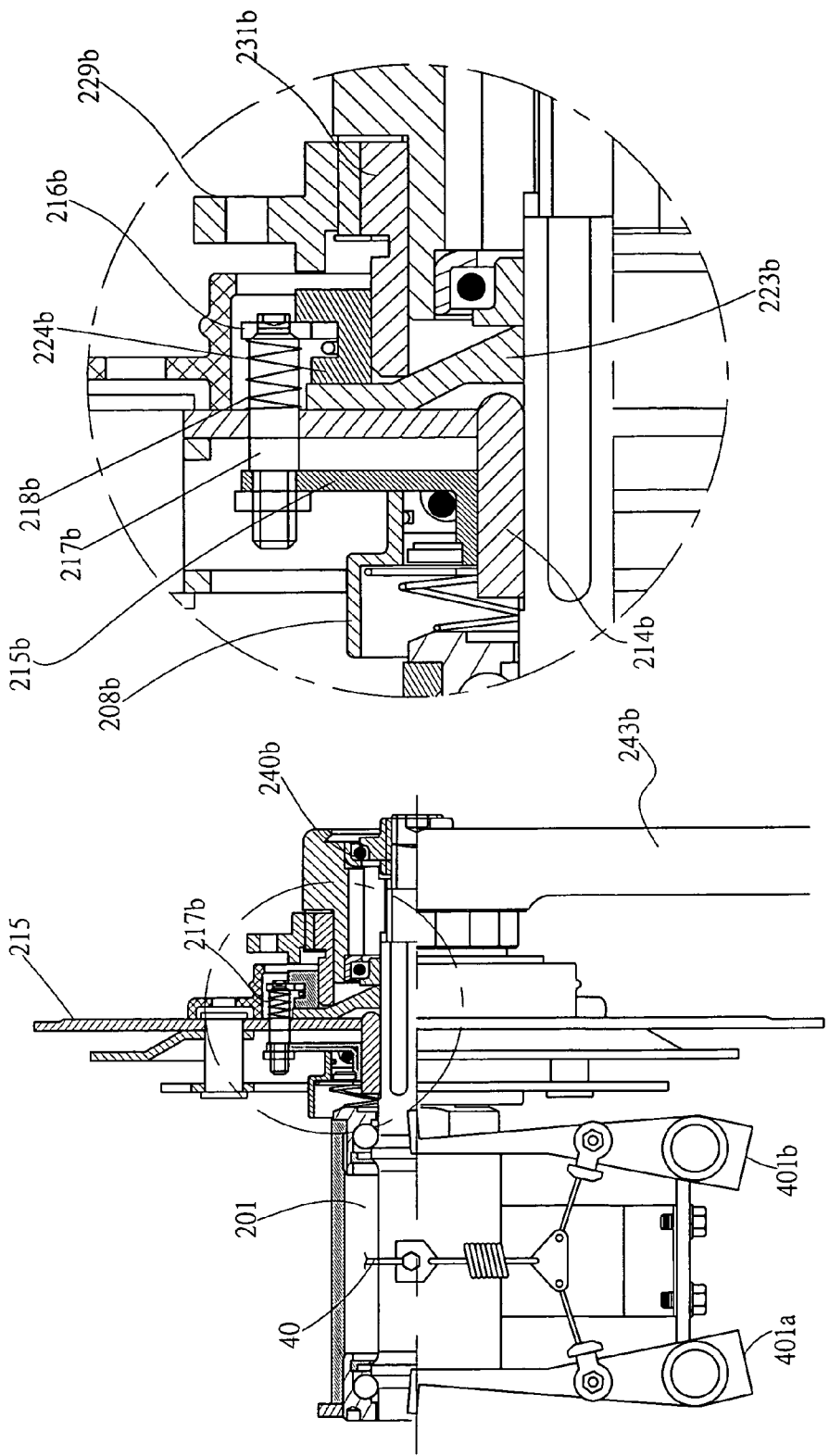

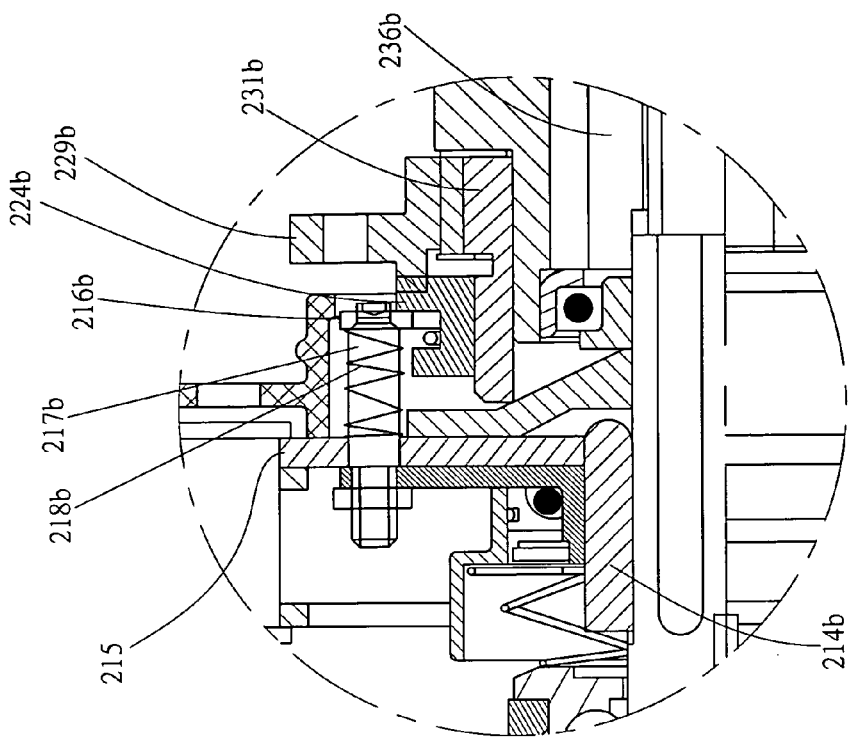
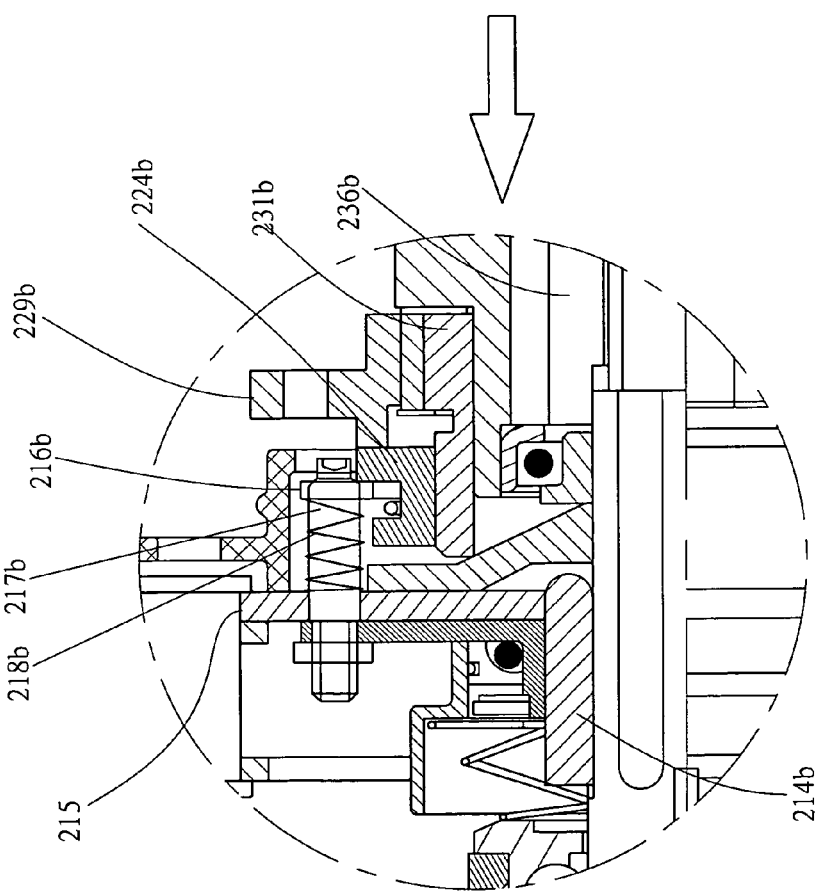

MULTIFUNCTIONAL PEDALING MOTION BICYCLE

BACKGROUND OF THE INVENTION

1. Field of the Invention

The present invention relates generally to an improved multifunctional pedaling motion bicycle, and in particular to a bicycle transmission that is controlled by a clutching device operable by fork-based control units to switch among a variety of exercising modes without the need of dedicated hub for switching.

2. The Related Art

Bicycles are often equipped with gear-shifting devices to change speed. The known gear-shifting devices, however, provide very limited advantage to bicycle-based exercising device. In Chinese Utility Model No. 91226879.4, the present inventor disclosed a transmission for multi-function bicycle, which provides a bicycle with operation modes other than the conventional pedaling operation, such as leverage exercise and independent operation of individual pedal. By means of the new ways of power transmission provided by the Chinese Utility Model, new modes for exercising or operating a bicycle can be effected, which is also applicable to bicycle-based exercising device, such as a stationary bike.

The device disclosed in the Chinese Utility Model, however, suffers the following disadvantages: (1) A dedicated rear hub is required in order to perform leverage exercise and the costs for the dedicated hub are high. (2) The dedicated rear hub has quite a weight, which causes troubles to the general consumers. (3) The transmission is prone to damages and failures.

In view of the above-discussed drawbacks, the present inventor has presented a different design that was disclosed in Chinese Utility Model No. 200520001872.6, which illustrates a bicycle transmission that is considered the previous version of the present invention. The bicycle transmission disclosed in the Chinese Utility Model is still subject to improvement, especially in respect of operation precision.

SUMMARY OF THE INVENTION

Thus, the present invention is aimed to provide an improvement over the above-discussed bicycle transmission, which ensures precise operation of switching among a variety of operation modes To achieve the above objectives, in accordance with the present invention, a transmission mechanism of bicycle is provided, comprising a clutch member that is manually controlled to move between and selectively engage primary and secondary control blocks to perform different modes of operation of the bicycle, including regular pedaling, independent pedaling of cranks, same-direction upward/downward movements of the cranks. The transmission mechanism has a simple and light-weighted structure and thus low cost and low failure risk with extended service life. Further, a variety of different operation modes can be performed without dedicated rear hub.

BRIEF DESCRIPTION OF THE DRAWINGS

The present invention will be apparent to those skilled in the art by reading the following description of preferred embodiments thereof, with reference to the attached drawings, in which:

FIG. 13 is a plan view showing the bicycle transmission mechanism of the present invention set in a regular pedaling mode;

FIG. 13A is an enlarged view of a circled portion of FIG. 13;

FIG. 15 is a plan view showing the bicycle transmission mechanism of the present invention subject to a reversed rotation;

FIGS. 15A is an enlarged view of a circled portion of FIG. 15; and

DETAILED DESCRIPTION OF THE PREFERRED EMBODIMENTS

Figure 4:
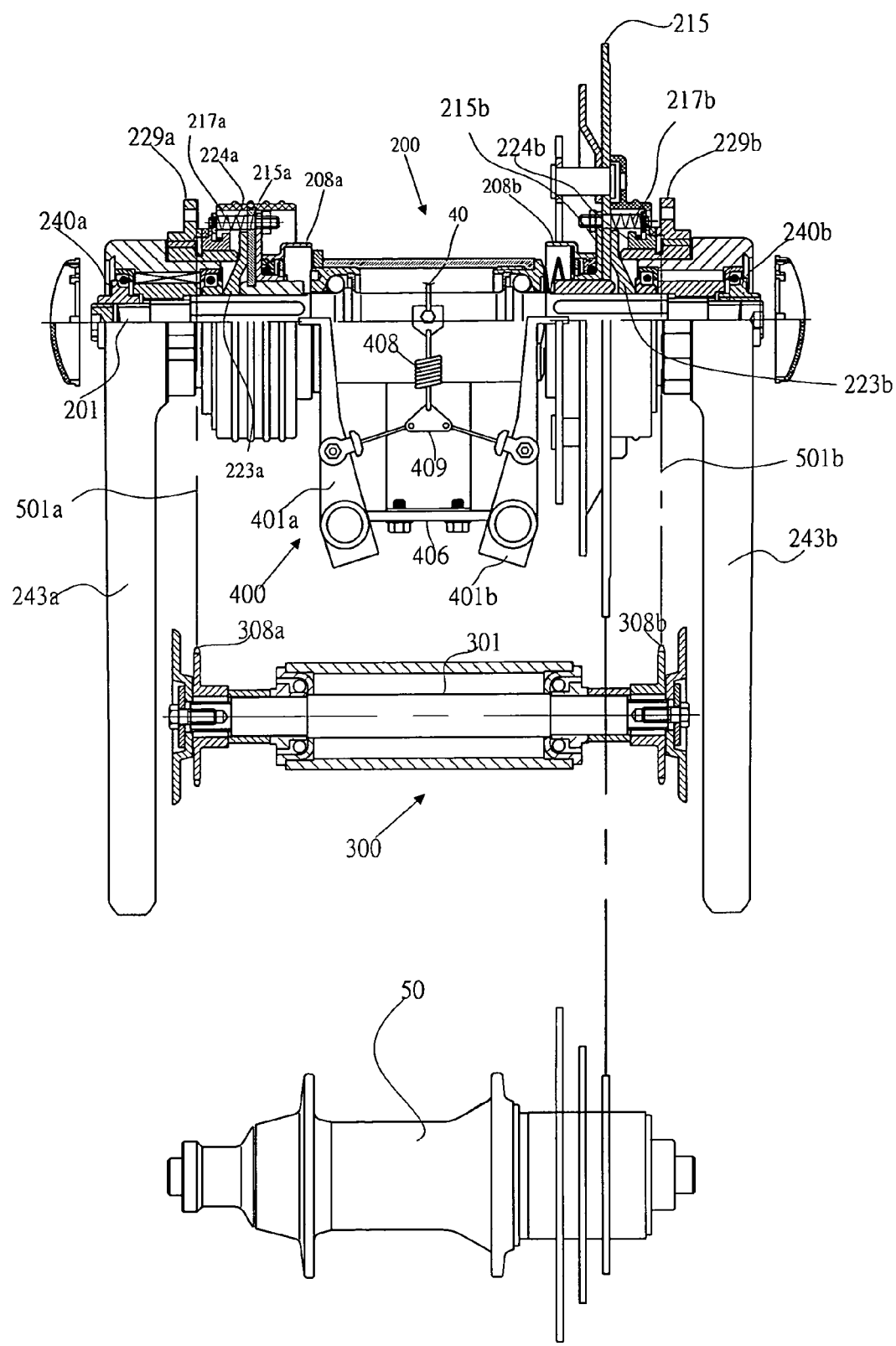
FIG. 4 is schematic plan view, partially taken away, showing the bicycle transmission mechanism of the present invention.
Figure 5:
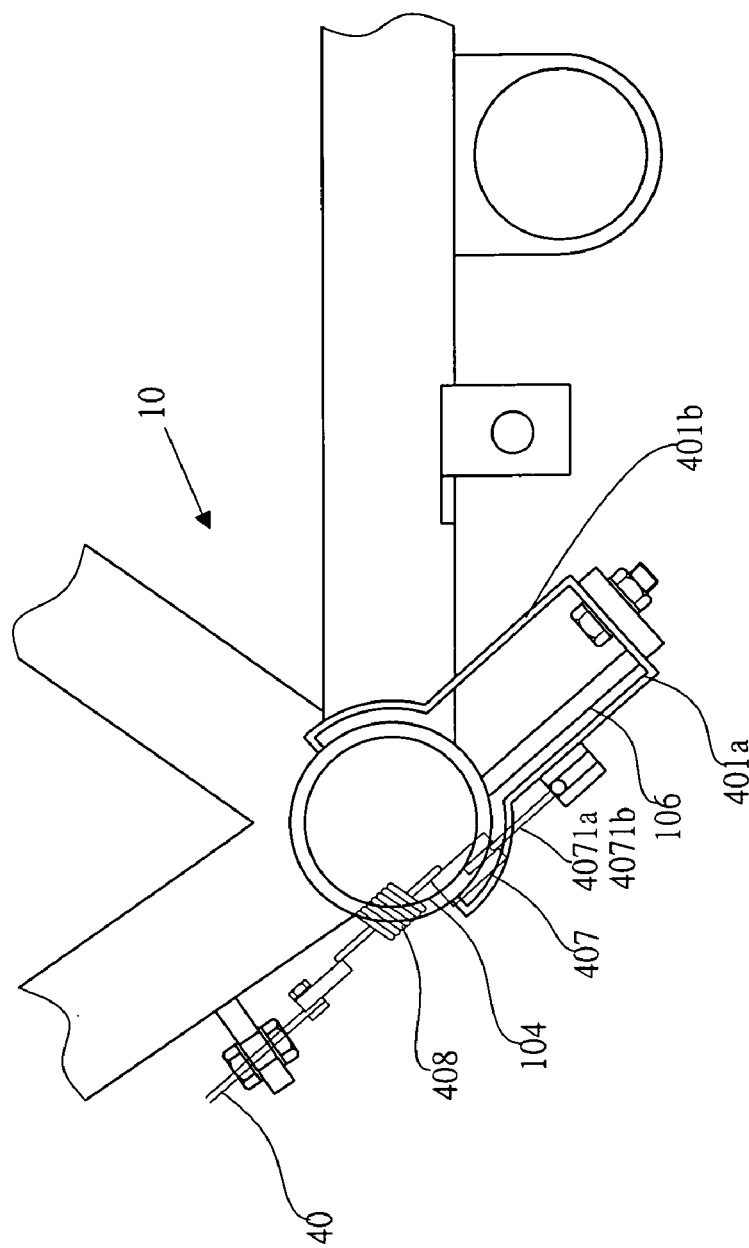
FIG. 5 is a side elevational view showing a portion of a bicycle frame to which the control mechanism is mounted, and also showing the locations where the primary axle assembly and the secondary axle assembly are mounted to the frame.

With reference to the drawings and in particular to FIGS. 4 and 5, a transmission mechanism constructed in accordance with the present invention is adapted to mount to a bicycle frame 10, especially a bottom bracket 104 of the frame 10. The bicycle frame 10 has two a crank shaft 201, which will also referred to as a "primary axle" hereinafter having opposite ends to which pedal cranks 243a, 243b are mounted, each pedal crank 243a, 243b carrying a pedal 502 (see FIG. 6) to take driving force from the foot 503 of a rider and inducing a torque on the crank shaft (primary axle) 201. The transmission mechanism of the present invention is operable to switch the operation modes of pedaling among a "regular mode" in which the bicycle of the present invention can be pedaled as a regular bicycle wherein the pedal cranks 243a, 243b and pedals 502 undergo continuous forward (or clockwise) rotation, an "independent" mode, in which the pedal cranks 243a, 243b can be rotated independently, and an "exercise" mode in which, when operated, the pedal cranks 243a, 243b undergo reciprocal rotation. Subassemblies of the transmission mechanism will be described hereinafter.

Figure 1:
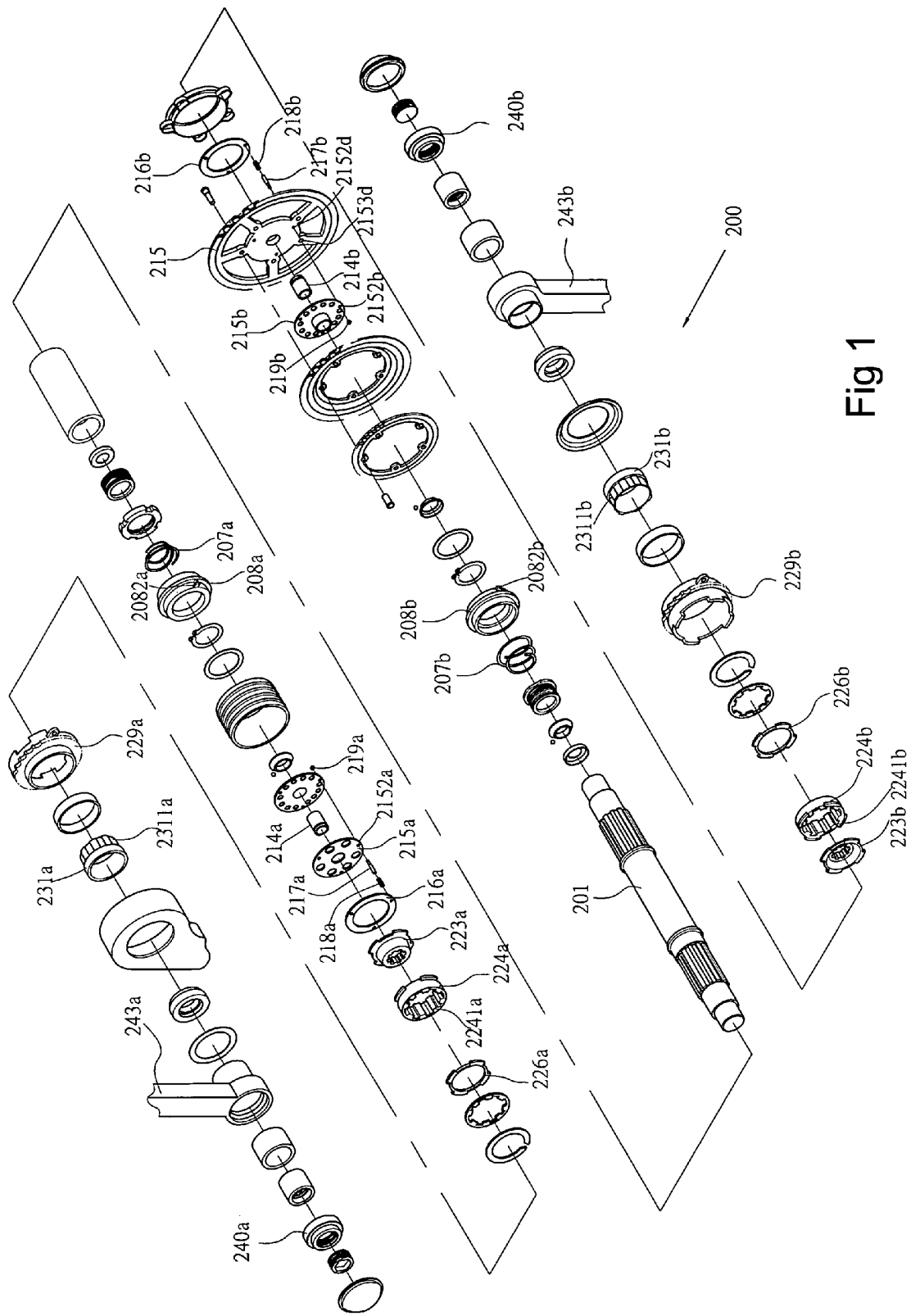
FIG. 1 is an exploded view of a primary axle assembly of a bicycle transmission mechanism in accordance with the present invention.
Figure 2:
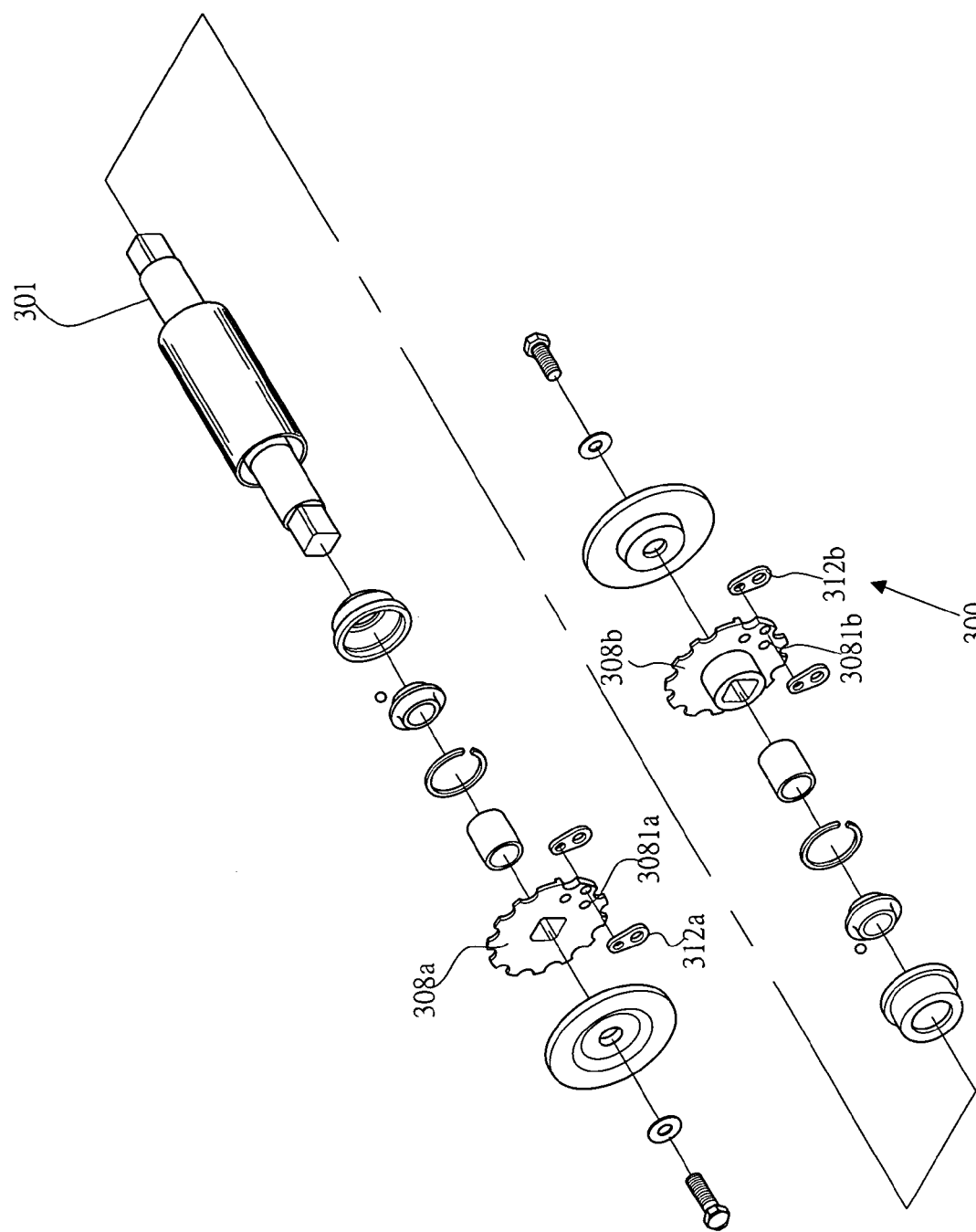
FIG. 2 is an exploded view of a secondary axle assembly of the bicycle transmission mechanism of the present invention.

Referring in particular to FIG. 1, which shows an exploded view of a pedal axle assembly of the transmission mechanism in accordance with the present invention, the pedal axle assembly, which will also be referred to as "primary axle assembly" hereinafter, is generally designated with reference numeral 200, comprising the primary axle (the crank shaft) 201, which as noted previously, has opposite ends coupled to the pedal cranks 243a, 243b, respectively, by fitting into a one-way bearing 240a, 240b received and fixed in each pedal crank 243a, 243b. The one-way bearings 240a, 240b allow torque to transmit from the pedals 502, through the pedal cranks 243a, 243b, to the primary axle 201 in a given rotational direction, such as forward or clockwise, but do not transmit the torque in an opposite direction, such as backward or counterclockwise. A chain wheel 215 is fixed to the primary axle 201 to be rotatable in unison therewith. In the embodiment illustrated, the chain wheel 215 is arranged next to one of the one-way bearings, for example the one-way bearing 240b, and is operatively coupled to a rear hub 50 (FIG. 4) by a chain (not shown), whereby the torque applied to the primary axle 201 by the rider through the cranks 243a, 243b, is transmitted to the rear hub 50 for driving the bicycle.

Figure 6:
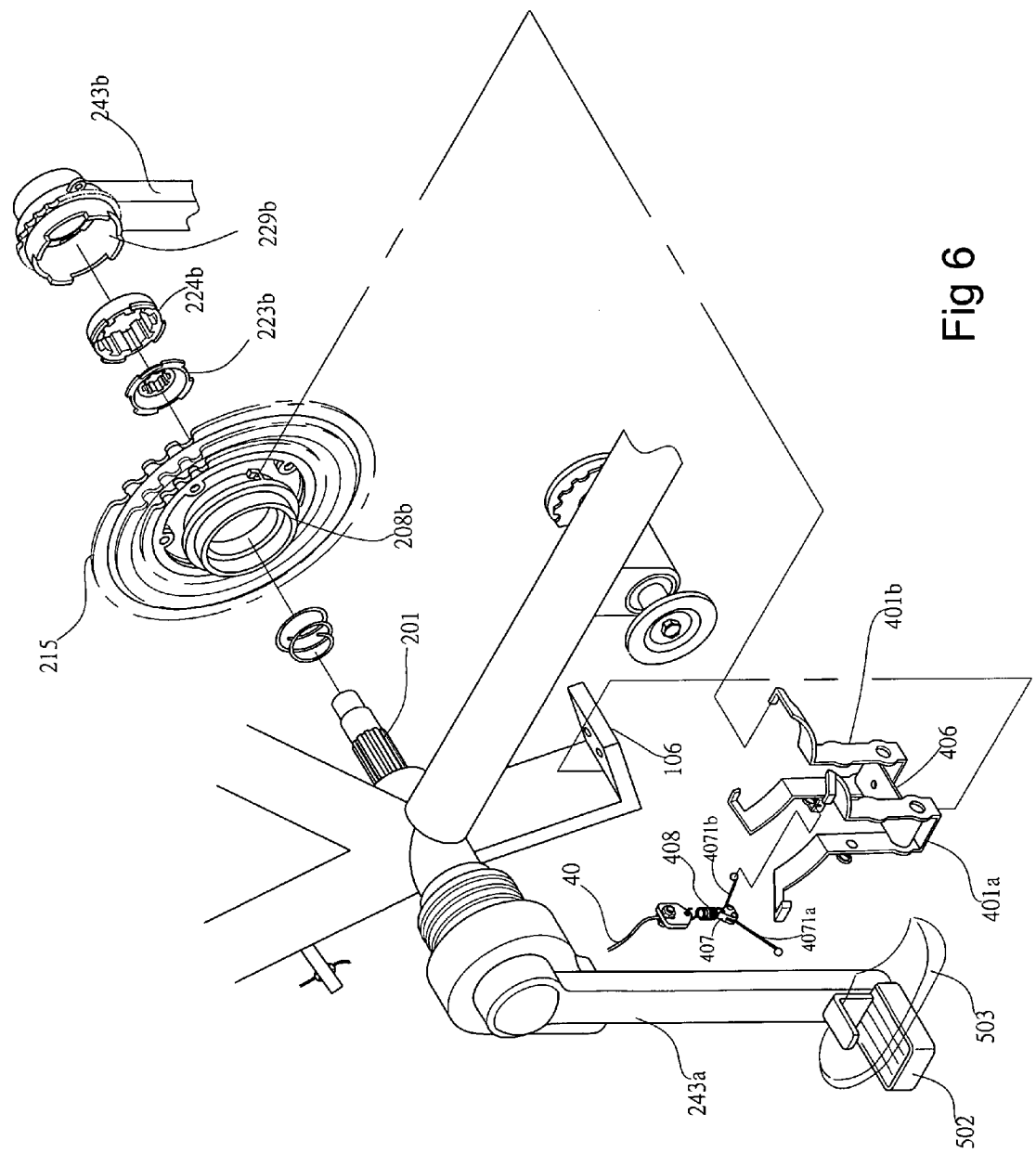
FIG. 6 is a perspective view, also showing the bicycle frame that supports the control mechanism and the locations of the primary axle assembly and the secondary axle assembly on the frame.
Figure 7A:
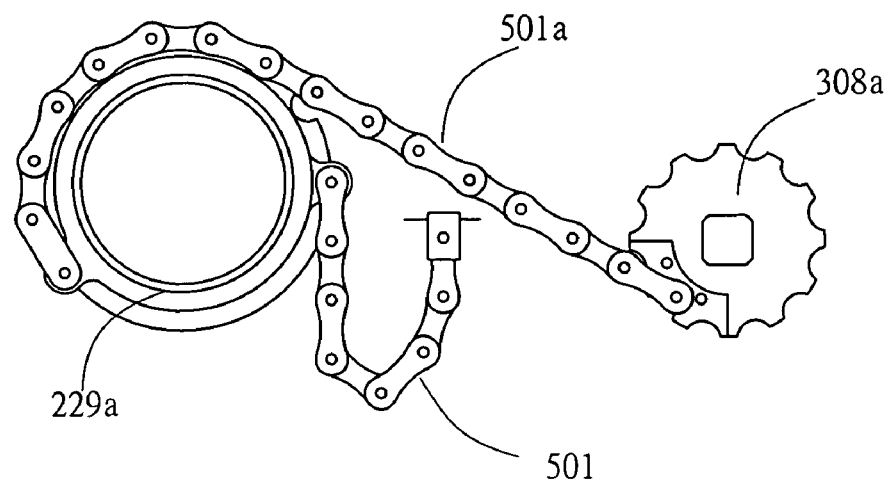
FIG. 7A is similar to FIG. 7 but showing chains connecting another secondary chain wheel of the secondary axle assembly to another secondary control block and the bicycle frame.
Figure 7:
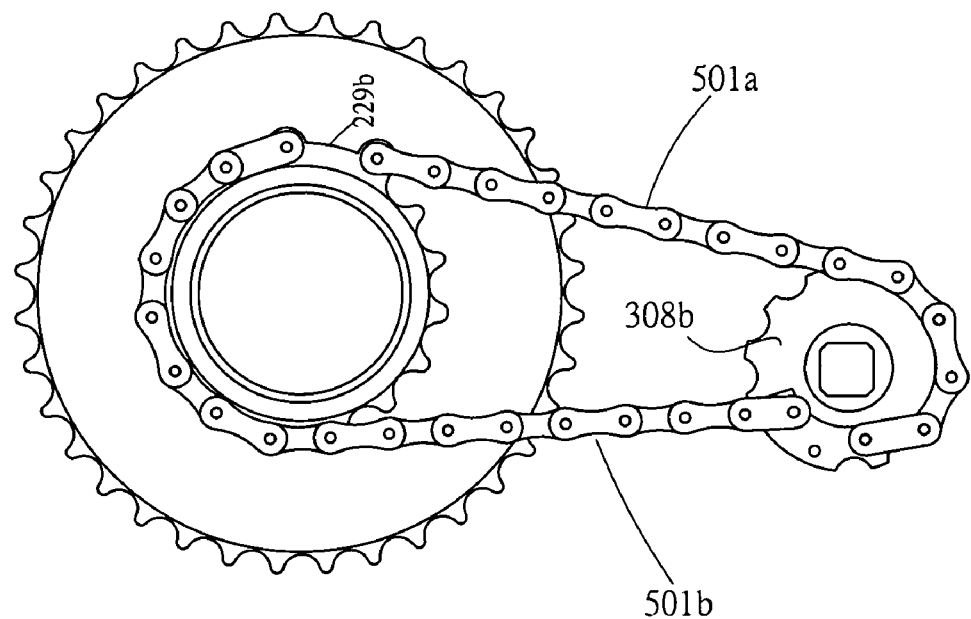
FIG. 7 is a side elevational view showing a chain connecting a secondary chain wheel of the secondary axle assembly to a secondary control block.

Also referring to FIGS. 2, 4, 7, and 7A, the transmission mechanism of the present invention comprises a secondary axle assembly 300, which is mounted to the bottom bracket 104 of the bicycle frame 10, preferably at a position behind the primary axle assembly 200 (as best seen in FIGS. 5 and 6). The secondary axle assembly 300 comprises a secondary axle 301 having opposite ends coupled to secondary chain wheels 308a, 308b, respectively, whereby the secondary chain wheels 308a, 308b are rotatable in unison with the secondary axle 301. Each secondary chain wheel 308a, 308b defines adjusting holes 3081a, 3081b to which fitting plates 312a, 312b are pivotally fixed for connection with ends of chains 501a, 501b. Opposite ends of the chains 501a, 501b are connected to secondary control blocks 229a, 229b to be further described. The secondary control block 229a is further connected to an end of the chain 502 and an opposite end of the chain 502 is fixed to the bicycle frame. The chains 502, 501a, 501b serve to limit the rotation angle of the reciprocal rotation performed in the exercise mode, which will be further described.

Figure 3:
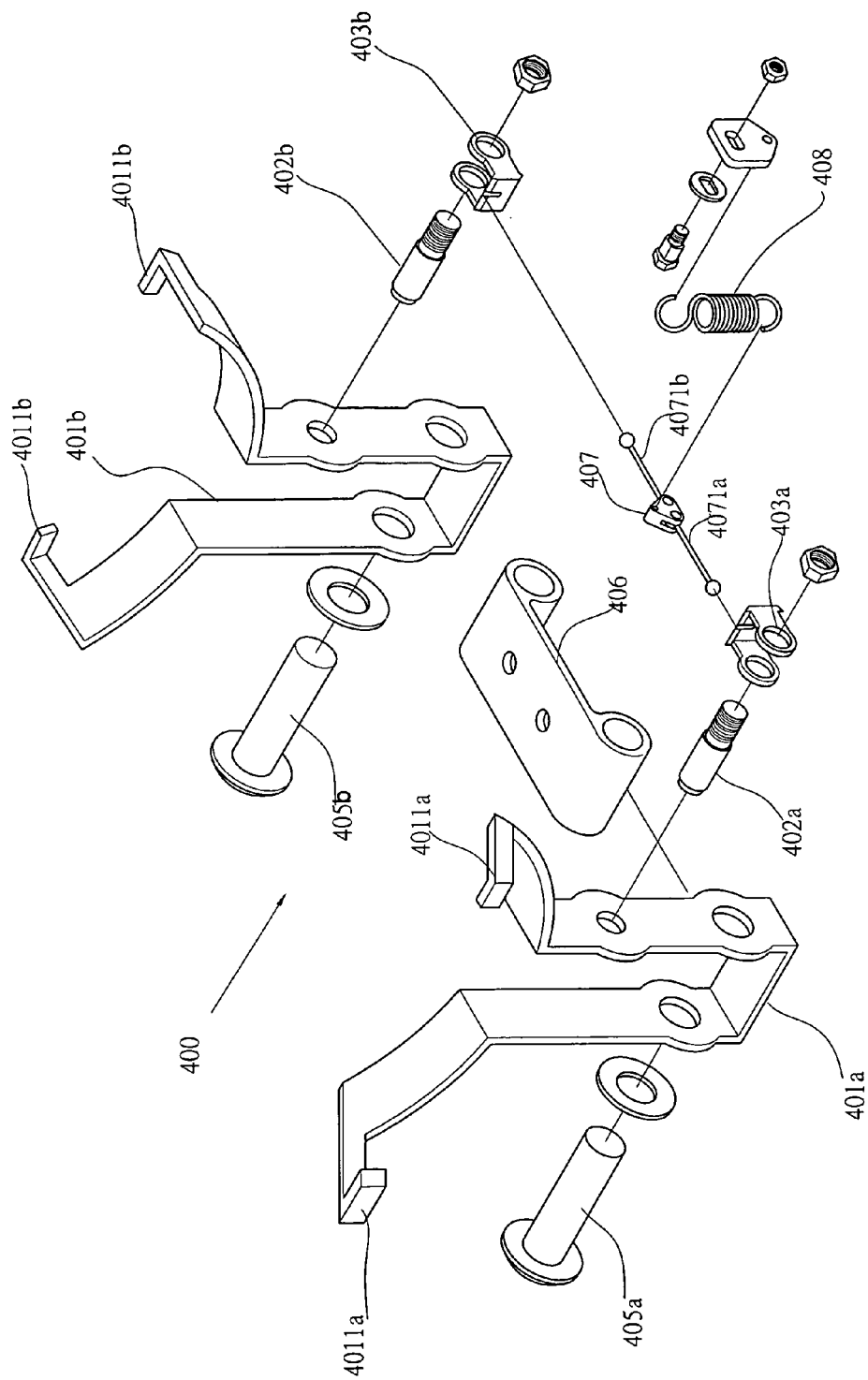
FIG. 3 is an exploded control mechanism of the bicycle transmission mechanism of the present invention.

Also referring to FIGS. 3, 5, and 6, a control mechanism 400 is mounted to a control mechanism mount 106, which is a projection formed on the bottom bracket 104 of the bicycle frame 10. The control mechanism 400 comprises a fixed base 406 that is fixed to the control mechanism mount 106 of the bicycle frame by fasteners or other known means that is not shown in the drawings, and two engaging forks 401a, 401b pivoted to opposite ends of the fixed base 406 by pins 405a, 405b and spaced from each other to allow for rotation of the engaging forks 401a, 401b with respect to the fixed base 406, whereby the engaging forks 401a, 401b are movable among first and second extreme positions, which are respectively corresponding to the regular mode and the exercise mode, and an intermediate position between the extreme positions and corresponding to the independent mode. A three-way connector 407 is arranged between the two engaging forks 401a, 401b and is connected to the engaging forks 401a, 401b with wires 4071a, 4071b. Free ends of the wires 4071a, 4071b are connected to connection members 403a, 403b that are rotatably fixed to the engaging forks 401a, 401b by pivots 402a, 402b. The connector 407 is also connected to a pull wire 40 via a spring 408 for manual operation of the engaging forks 401a, 401b.

Referring particularly to FIG. 4, the primary axle assembly 200 is mounted to the bottom bracket 104 of the bicycle frame 10 with the pedal cranks 243a, 243b located on opposite sides of the bottom bracket 104. The control mechanism 400 is also fixed to the bottom bracket 104 and is operatively coupled to the primary axle assembly 200 for controlling the operation of the primary axle assembly 200, with the aid of the secondary axle assembly 300, to selectively effect the regular operation mode, the exercise mode, and the independent mode.

Figure 16:
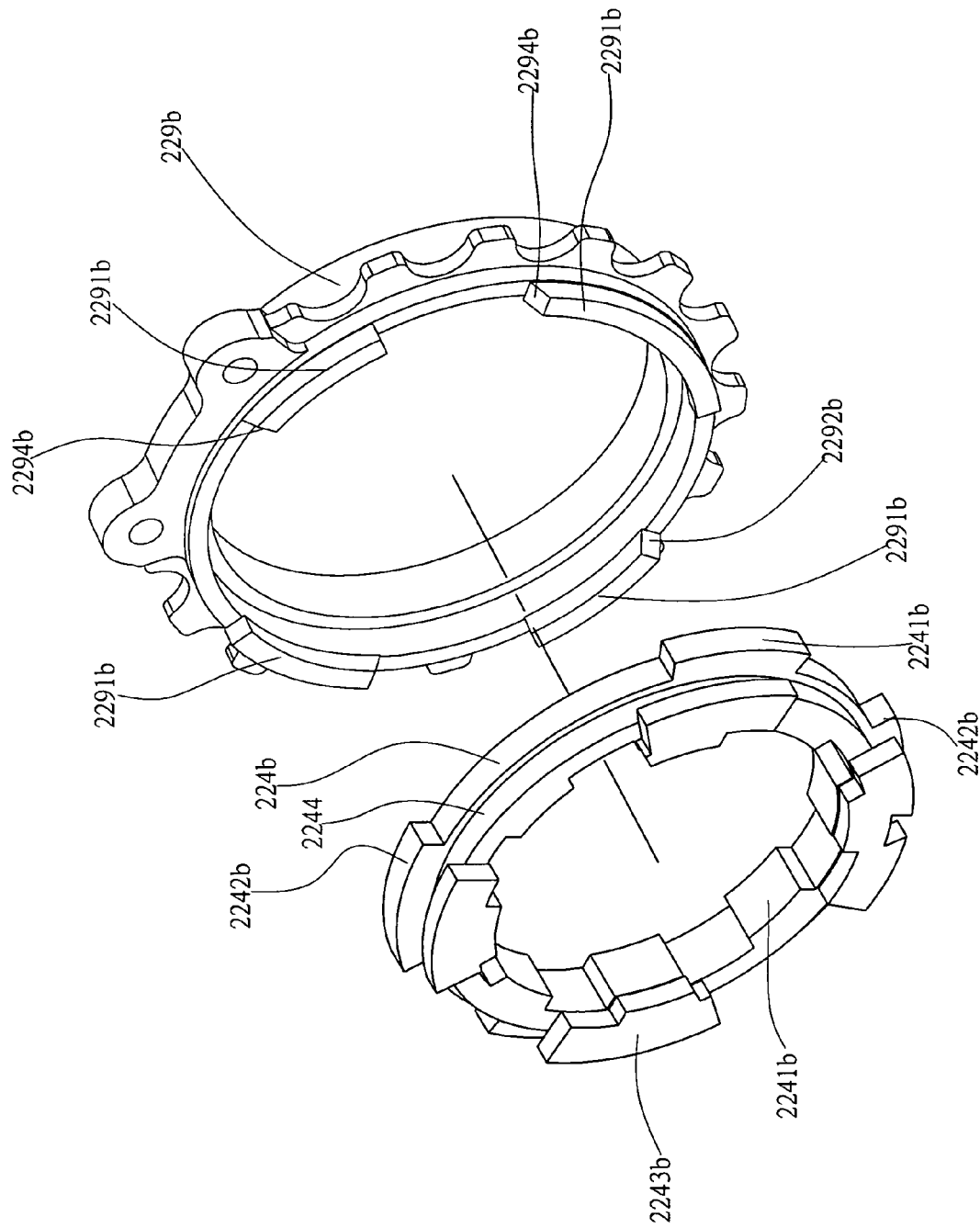
FIG. 16 is a perspective view illustrating spatial relationship between the secondary control block and a clutching ring.

Before further explanation is given, it is to be noted first that the primary axle assembly 200 comprises a clutching ring 224a, 224b associated with each crank pedal 243a, 243 and a toothed ring key 226a, 226b, of which the function will be described later. As shown in FIG. 1, the clutching ring 224a, 224b is separate from the toothed ring key 226a, 226b and are then fixed together. To simplify the manufacturing and assembly, as an alternative, and as shown in FIG. 16, the clutching ring 224a, 224b and the toothed ring key 226a, 226b are integrated and combined together as a unitary member. To simplify the description that follows, the illustration is made with reference to the "combined" clutching ring and toothed ring key, which will also be referred to as "clutching ring" and designated with reference numeral 224a, 224b. In other words, the clutching ring 224a, 224b in all the drawings, except FIG. 1, is a combination of the clutching ring 224a, 224b and the toothed ring key 226a, 226b of FIG. 1. In this case, as shown in FIG. 16, the clutching ring 224a, 224b comprises first and second circumferentially-spaced teeth 2243b, 2242b on opposite axial ends thereof with a circumferential groove 2244 formed therebetween. Thus, the second teeth 2242b replaces the place of the toothed ring key 226b.

The clutching ring 224a, 224b has inner teeth 2241a, 2241b movably fit over a toothed surface 2311a, 2311b of a guide cylinder 231a, 231b tightly fit over and rotatable in unison with the pedal crank 243a, 243b. This allows the clutching ring 224a, 224b to axially movable with respect to the primary axle 201 and the pedal cranks 243a, 243b.

At an inbound side of the primary chain wheel 215, a driving collar 2082a, 208b and a driving disk 215a, 215b are coaxially mounted on and are axially movable along a tubular extension 214a, 214b. The tubular extension 214b is also fit into a bore 2153d of the primary chain wheel 215. The driving disk 215a, 215b is coupled to the clutching ring 224a, 224b, by axially-extending connection rods 217a, 217b, only one being visible in FIG. 1. One end of the connection rod 217a, 217b is fixed to a holding ring 216a, 216b and an opposite end, which is threaded, extends through a hole 504 defined in the driving disk 215a, 215b and is fixed by for example a nut 219a, 219b. The connection rod 217b also axially and movably extends through a corresponding hole 2152d defined in the primary chain wheel 215.

The holding ring 216a, 216b is received in the circumferential groove 2244 of the clutching ring 224a, 224b. A biasing element 218a, 218b, preferably a helical spring encompassing the connection rod 217a, 217b, is arranged between the holding ring 216a, 216b, which is mounted to the and the driving disk 215a and the primary chain wheel 215 to provide a basing force therebetween, which ensures the relative position between the clutching ring 224a, 224b and the driving disk 215a, 215b and also allows the relative position to change under a sufficient axial load, which will be further described.

The driving collar 2082a, 208b is axially movable by the engaging fork 401a, 401b between the first and second extreme positions and this will be further discussed. When the driving collar 2082a, 208b is axially moved, the clutching ring 224a, 224b is also allowed to move between the first and second extreme positions by being connected to the driving disk 215a, 215b by the connection rods 217a, 217b. In the first extreme position, the clutching ring 224a, 224b is engageable with a primary control block 223a, 223b and in the second extreme position, the clutching ring 224a, 224 is engageable with a secondary control block 229a, 229b. The primary and secondary control blocks 223a, 223b are located on opposite sides of the driving collar 2082a, 208b. The secondary control blocks 229a, 229b are drivingly coupled to the secondary chain wheels 308a, 308b of the secondary axle assembly 300 by the chains 501a, 501b, respectively.

Referring to FIGS. 5 and 6, the bottom bracket 104 of the bicycle frame 10 forms a projection serving as the control mechanism mount 106 to which the fixed base 406 that rotatably supports the engaging forks 401a, 401b, is fixed by any known means, such as bolt, rivet, and welding. A manual control (not shown) is mounted to the bicycle frame 10 and connected to the three-way connector 407 via the pull wire 40 that is connected to the connector 407 by the spring 408. Thus, the manual control allows a user to control and operate the engaging forks 401a, 401b via the three-way connector 407, which, as mentioned previously, is connected to the engaging forks 401a, 401b by wires 4071a, 4071b and the connection members 403a, 403b of the engaging forks 401a, 401b. For example, manually pulling or exerting a tension to the pull wire 40 causes the engaging forks 401a, 401b to approach each other, while releasing the pull wire 40 allows the engaging forks 401a, 401b to move away from each other.

To simplify the description, only parts that bear a reference label with a postfix of "b" will be demonstrated, while those having postfix "a" are corresponding counterpart having identical or functionally similar construction of which description may be omitted hereinafter.

Referring to FIG. 6, the pedal cranks 243a, 243b transmit manual pedaling power or torque from the pedals 502 to the primary axle 201, which in turn rotates the primary chain wheel 215. The pivotal connection of the engaging forks 401a, 401b to the base 406 of the control mechanism 400 allows the engaging forks 401a, 401b to move toward/away from each other when the pulling wire 40 is manually pulled or released. Each engaging fork 401a, 401b has two spaced limbs each forming a hooked end 4011a, 4011b engageable corresponding notches 506 (see FIG. 1) formed in the driving collars 2082a, 208b, respectively. This makes the driving collars 2082a, 208b movable in unison with the engaging forks 401a, 401b when the engaging forks 401a, 401b are driven by the pull wire 40. In other words, by manually pulling/releasing the pull wire 40, the engaging forks 401a, 401b are moved (by being rotated with respect to the base 406), and the movements of the engaging forks 401a, 401b in turn cause the driving collars 2082a, 208b to axially move between the first extreme position where the primary control blocks 223a, 223b are located and the second extreme position where the secondary control block 229a, 229b are located, due to the engagement between the hooked ends 4011a, 4011b of the engaging forks 401a, 401b and the notches 2082b of the driving collars 2082a, 208b. The driving collars 2082a, 208b are thus positionable at (1) the first extreme position where the driving collars 2082a, 208b are in driving engagement with the primary control blocks 223a, 223b to effect the regular mode, (2) the second extreme position where the driving collars 2082a, 208b are in driving engagement with the secondary control blocks 229a, 229b to effect the exercise mode, and an intermediate position between the first and second extreme positions, where the driving collars 2082a, 208b do not engage with both the primary control blocks 223a, 223b and the secondary control blocks 229a, 229b and an "independent" operation mode is effected by which the two pedal cranks 243a, 243b can be rotated independently.

Preferably, a biasing element 207a, 207b, such as a spring, is arranged between each driving collar 2082a, 208b and the primary axle 201 that biases the driving collar 2082a, 208b toward the second extreme position where the driving collar 2082a, 208b engages the second control block 229a, 229b.

Referring to FIGS. 8, 8A, 9, 9A, 10, and 10A, the operation of the transmission mechanism will now be described. By manually releasing the pull wire 40, the engaging forks 401a, 401b are allowed to move away from each other, and under the biasing action of the springs 207a, 207b, the clutching rings 224a, 224b are forced into driving engagement with the secondary control blocks 229a, 229b with teeth 2242b of the clutching rings 224a, 224b mating axially extending and circumferentially spaced teeth 2291b of the secondary control block 229a, 229b. Under this situation, which is the exercise mode, besides transmitted through the primary axle 201 to the primary chain wheel 215, the pedaling force or torque from the pedal cranks 243a, 243b is partly transmitted through the clutching ring 224a, 224b and the secondary control blocks 229a, 229b to the secondary chain wheels 308a, 308b of the secondary axle 300 (see FIG. 4). Due to the limitation in rotation angle of the secondary chain wheels 308a, 308b imposed by the chains 502, 501a, 501b and also owing to the one-way bearings 240a, the pedal cranks 243a, 243b are allowed to take reciprocal rotation. During a forward (clockwise) rotation, the pedaling torque is transmitted through the primary axle 201 to the primary chain wheel 215 and eventually to the rear hub 50 and during a backward (counterclockwise) rotation, no pedaling torque is transmitted to the primary axle 201 because of the one-way bearing 240a, 240b. Thus, the pedaling force is intermittently transmitted to the primary axle 201 by both pedal cranks 243a, 243b to drive the rear hub 50. In this exercise mode, by making the pedal cranks 243a, 243b to extend in the same direction, which can be done is the independent mode and will be further described, the pedals 502 of the pedal cranks 243a, 243b are allowed to simultaneously move upward or downward, while the cranks 243a, 243b are simultaneously rotated forward or backward.

Referring now to FIGS. 15 and 15A, it is noted that during the backward rotation of the exercise mode, the engagement between the clutching ring 224a, 224b and the secondary control blocks 229a, 229b is subject to reverse rotation due to the fact that the clutching rings 224a, 224b are rotatably fixed to the pedal crank 243a, 243b by the guide cylinders 231a, 231b and also due to the fact that during the backward rotation of the pedal cranks 243a, 243b, the primary axle 201 and thus the primary chain wheel 215 do not follow the backward rotation and are generally held still because of the one-way bearing 240a, 240b. In other words, there is a conflict in rotary motion between the secondary control block 229a, 229b and the primary chain wheel 215.

As shown in FIG. 16, when the pedal crank 243b is pedaled in a reciprocated manner, the reversed rotation between the secondary control block 229b and the clutching ring 224b occurs at every half cycle of the pedaling operation of the crank 243b, while the one-way bearing 240b prevents the primary axle 201 and the primary chain wheel 215 from reversed rotation and thus keeping the chain wheel 215 still. The force transmitted between the clutching ring 224b and the secondary control block 229b eventually gets exceeding a camming force acting between each tooth 2242b of the clutching ring 24 and an inclination 2294b formed on the associated tooth 2291b of the secondary control block 229b, which camming force is induced in the axial direction by the biasing element 218b arranged between the clutching ring 224b and the driving disk 215b. Thus, the clutching ring 224b is allowed to move axially against the spring 218b and disengages from the secondary control block 229b to effect idle rotation of the secondary control block 229b. Apparently, no dedicated hub 50 is needed in handling the reversed rotation.

Figures 8, 8A:
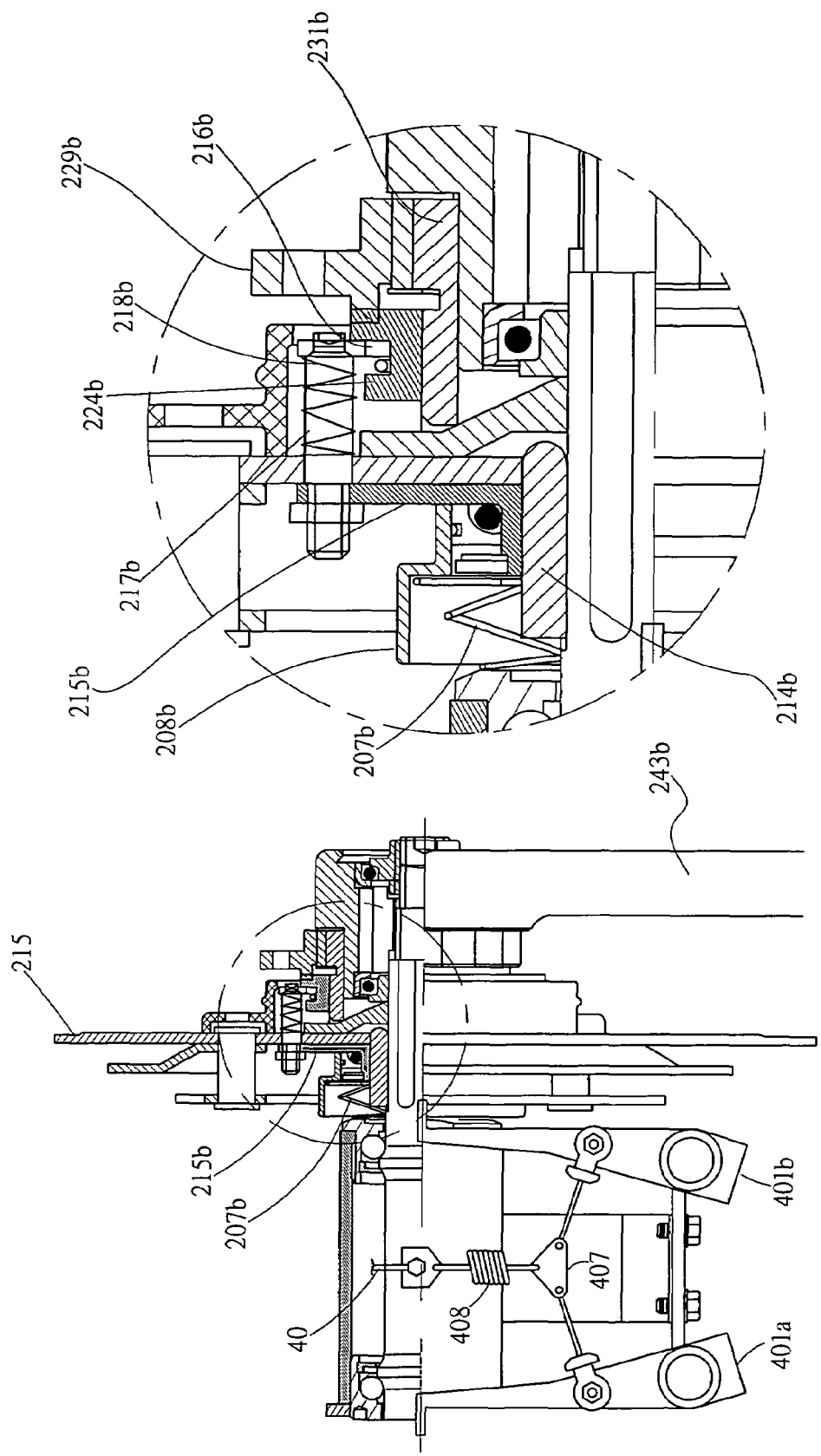
FIG. 8 is a plan view showing the bicycle transmission mechanism of the present invention set in an exercise mode.
FIG. 8A is an enlarged view of a circled portion of FIG. 8.
Figure 9:
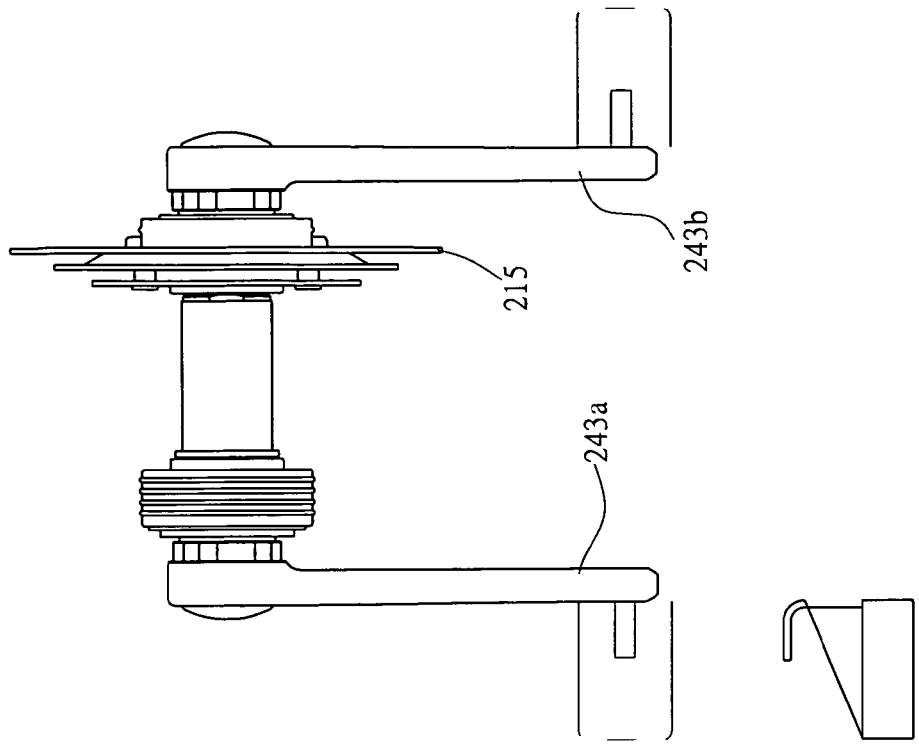
FIG. 9 is a plan view showing the condition where pedals of the bicycle are of identical-direction upward/downward movement.
Figure 9A:
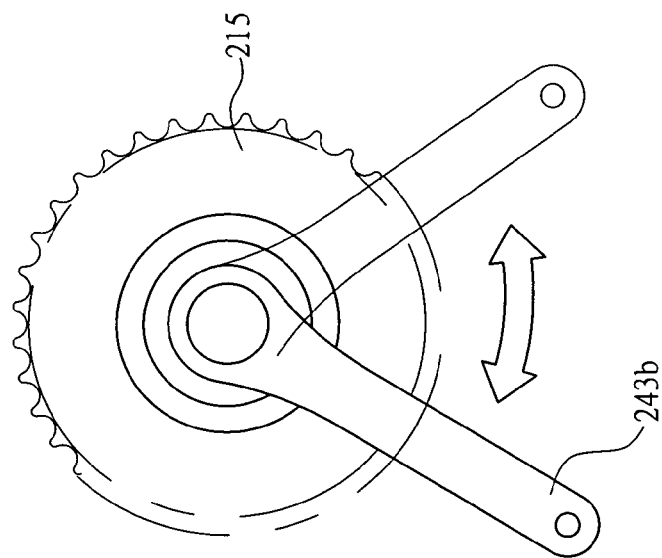
FIG. 9A is a side elevational view corresponding to FIG. 9.
Figure 10:
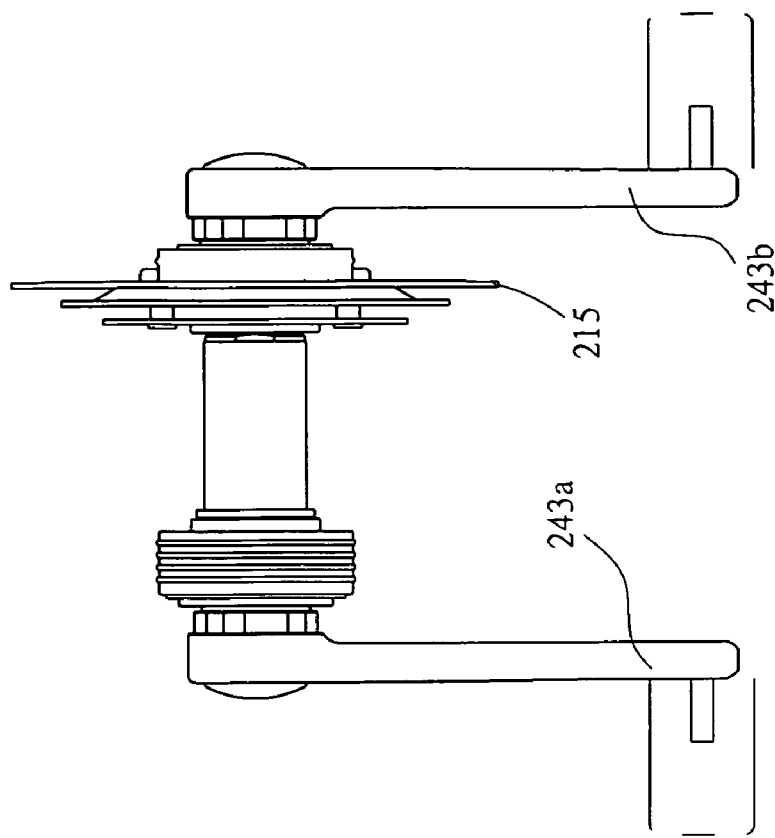
FIG. 10 is a plan view showing the condition where the pedals of the bicycle are of opposite-direction upward/downward movement.
Figure 10A:
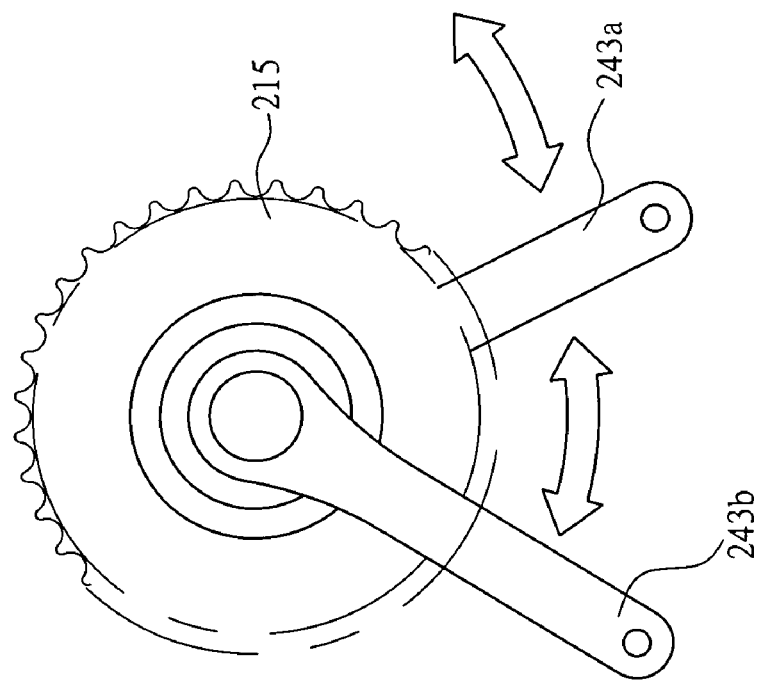
FIG. 10A is a side elevational view corresponding to FIG. 10.
Figure 11A:
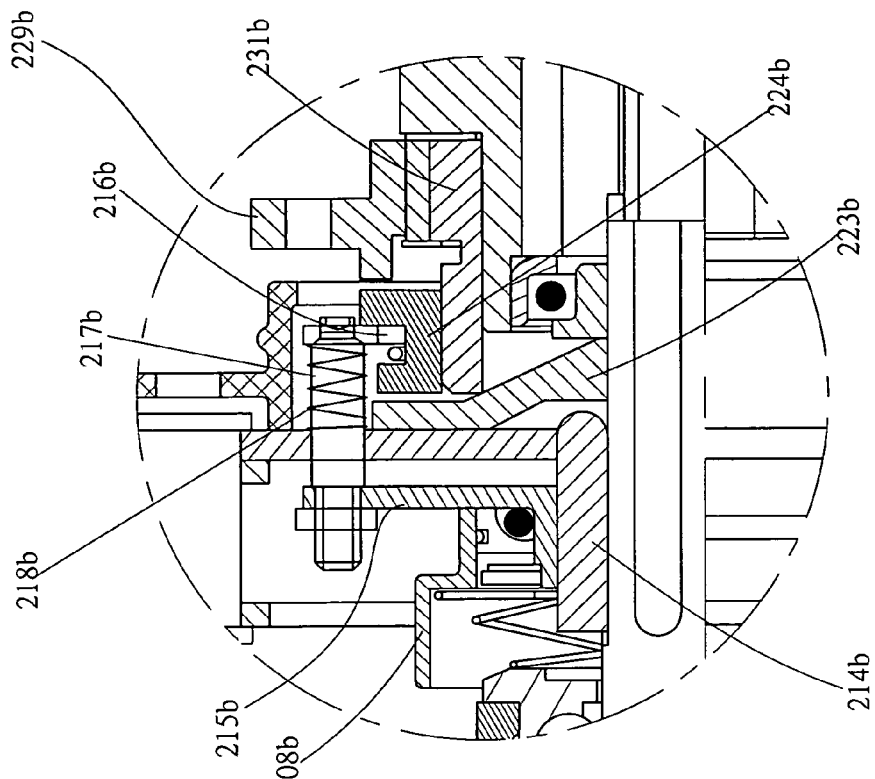
FIG. 11A is an enlarged view of a circled portion of FIG. 11.
Figure 11:
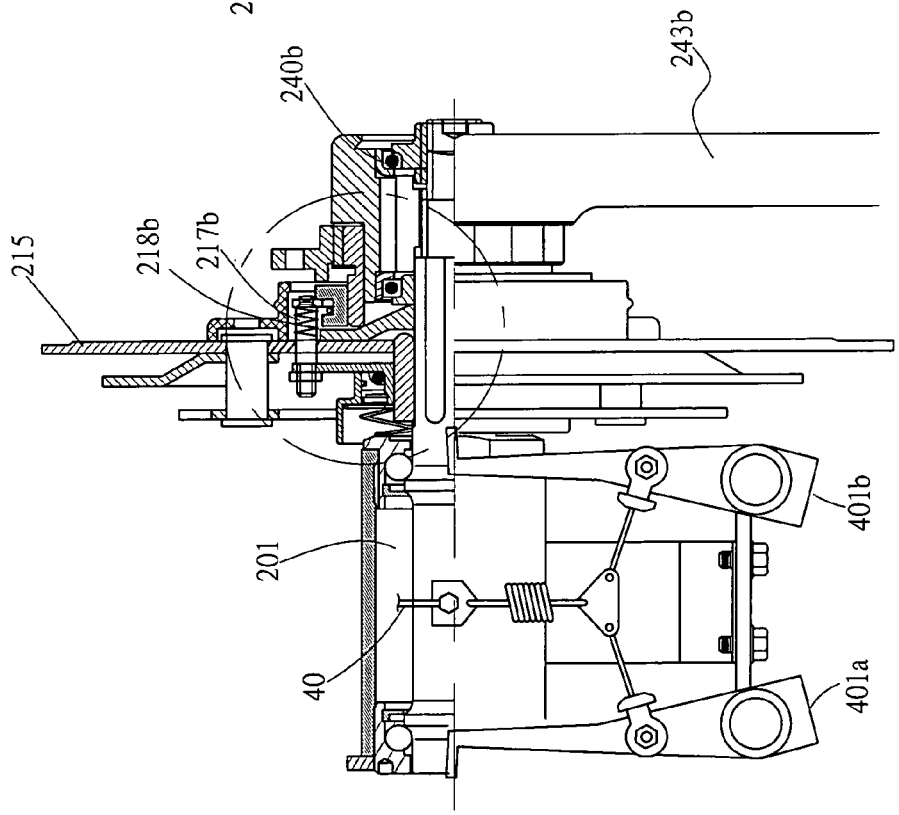
FIG. 11 is a plan view showing the bicycle transmission mechanism of the present invention set in an independent mode.
Figure 12:
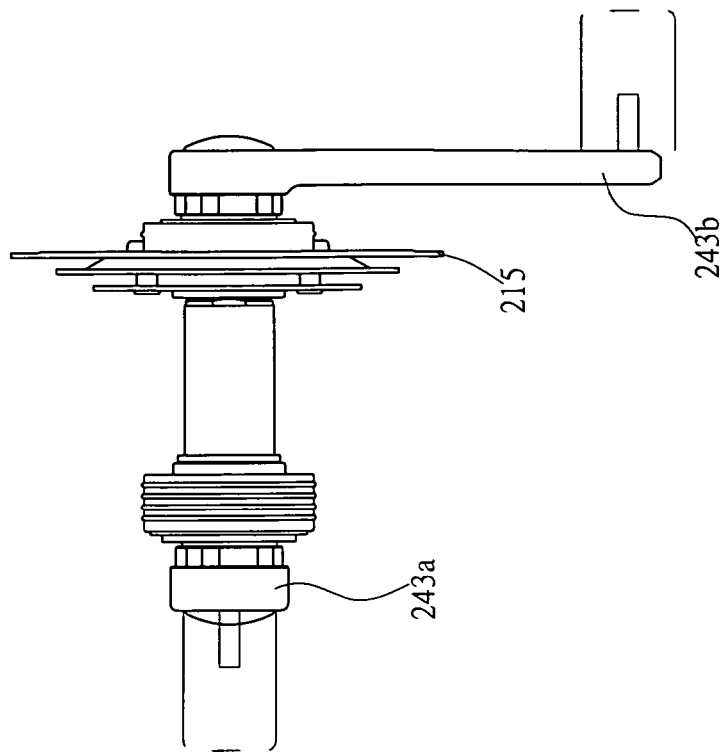
FIG. 12 is a plan view showing the condition where each pedal of the bicycle is independently moved upward/downward.
Figure 12A:
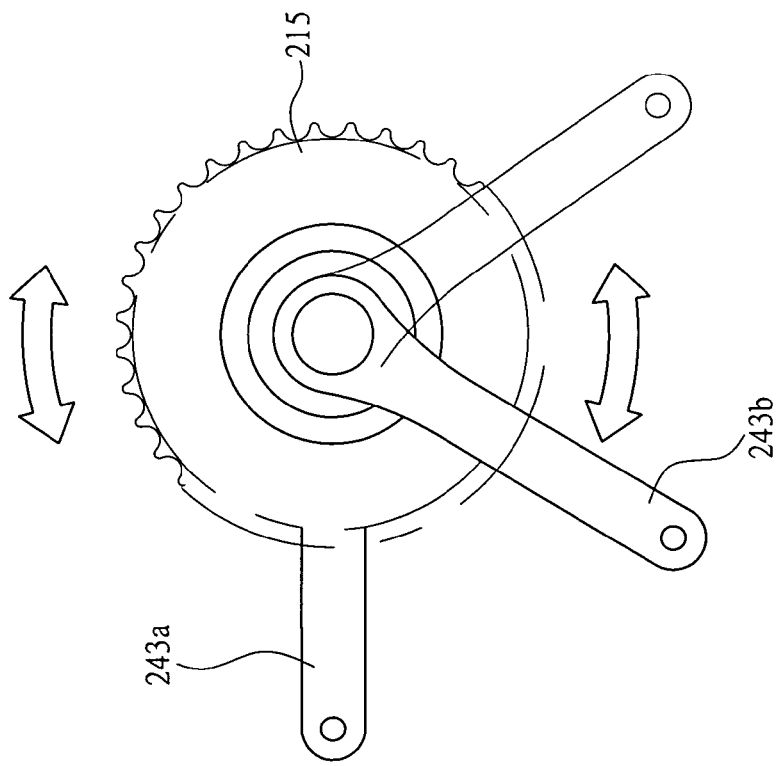
FIG. 12A is a side elevational view corresponding to FIG. 12.
Figure 14:
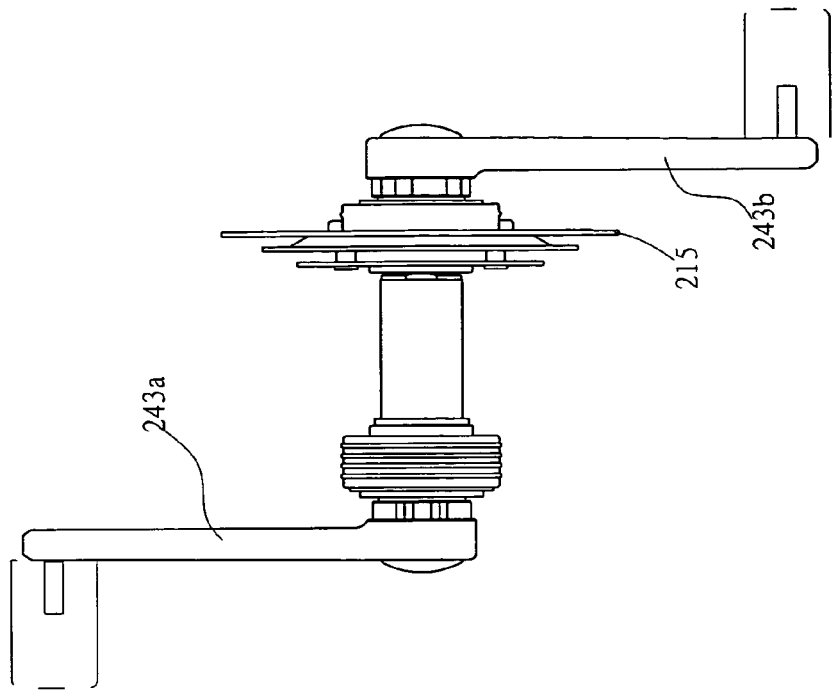
FIG. 14 is a plan view showing the condition where pedals are driven in a regular way.
Figure 14A:
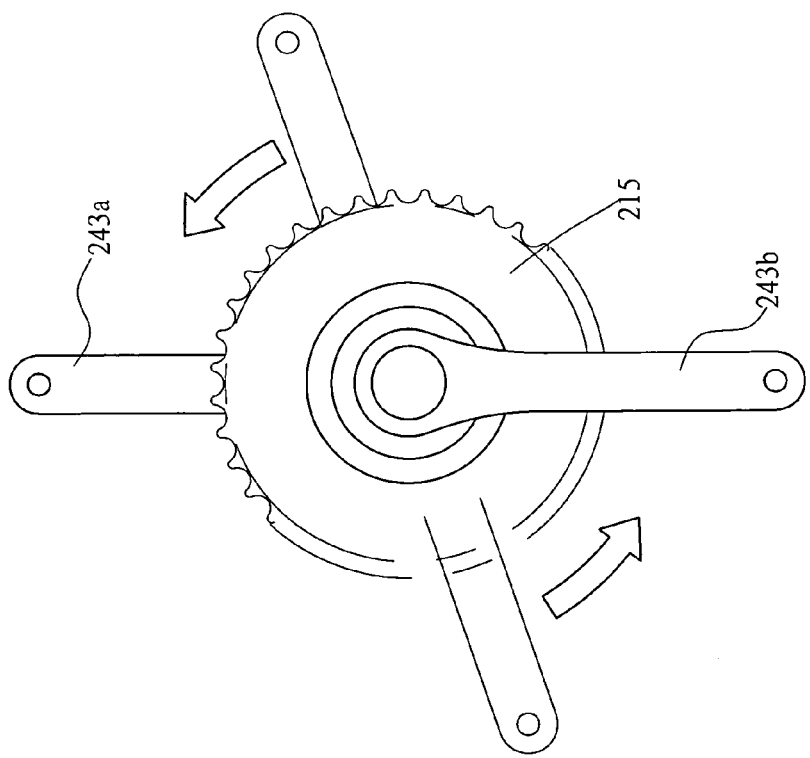
FIG. 14A is a side elevational view corresponding to FIG. 14.

As shown in FIGS. 8 and 8A, the pedaling force of the pedal cranks 243a, 243b is transmitted to the primary axle 201 via the one-way bearings 240a, 240b, which is in turned converted to the primary chain wheel 215 for driving the rear hub 50. The clutching rings 224a, 224b only serve to set the transmission mechanism in the exercise mode, not to transmit the pedaling force. In other words, the clutching rings 224a, 224b need not be of great strength to bear the pedaling force.

Referring to FIG. 11, 11A, 12, and 12A, to switch to the independent mode, the driving collars 2082a, 208b are moved by the pulling wire 40 and the engaging forks 401a, 401b to separate from the secondary control blocks 229a, 229b, and are positioned between the first and second extreme positions where the clutching rings 224a, 224b do not engage both the primary control blocks 223a, 223b and the secondary control blocks 229a, 229b. Consequently, the pedal cranks 243a, 243b are independent of each other in operation, which means the cranks 243a, 243b can be moved separately and the pedaling force of each crank 243a, 243b is independently transmitted to the primary axle 201, which is in turn transmitted to the rear hub 50 through the primary chain wheel 215. The pedal cranks 243a, 243b can be moved simultaneously in the same direction or opposite directions or one pedal crank 243a, 243b is moved while the other one is held still. A variety of combinations of movements of the pedal cranks 243a, 243b can be realized, all providing pedaling power to the rear hub 50 through the primary axle 201 and the primary chain wheel 215.

Referring to FIGS. 13, 13A, 14, and 14A, to switch to the regular mode, the pulling wire 40 is pulled to move the driving collars 2082a, 208b and thus the clutching rings 224a, 224b into engagement with the primary control blocks 223a, 223b to lock the pedal cranks 243a, 243b with the primary axle 201 and thus allowing for continuous forward or backward rotation of the primary axle 201 by the pedals 502. In this mode, it is preferably the pedal cranks 243a, 243b are held in opposite extension directions to effect regular pedaling operation, which provides pedaling force to the primary axle 201 and the primary chain wheels 215 for driving the rear hub 50.

In the operation, by tensioning/releasing the pulling wire 40 to control the engaging forks 401a, 401b for axially shifting the driving collars 2082a, 208b, the clutching rings 224a, 224b is axially moved to selectively engage the primary control blocks 223a, 223b and the secondary control blocks 229a, 229b whereby pedal cranks 243a, 243b can take various combinations of individual movements to supply driving force or pedaling force to the rear hub 50 through the primary axle 201 and the primary chain wheel 215.

The present invention offers the following advantages:

(1) The improved multifunctional pedaling motion bicycle, particularly to a transmission mechanism of the present invention has a simple structure, which allows for a variety of operation modes without a dedicated rear hub, whereby manufacturing costs are low and economic value is enhanced.

(2) The improved multifunctional pedaling motion bicycle, particularly to a transmission mechanism of the present invention is light-weighted, which implies easiness of handling and use.

(3) The improved multifunctional pedaling motion bicycle, particularly to a transmission mechanism of the present invention has low risk of failure, if not failure free, and thus extended service life.

Although the present invention has been described with reference to the preferred embodiments with reference to the drawings thereof, it is apparent to those skilled in the art that a variety of modifications and changes may be made without departing from the scope of the present invention which is intended to be defined by the appended claims.

What is claimed is:

1. A multifunctional pedaling motion bicycle having a frame and comprising a primary axle assembly rotatably mounted to the frame, a secondary axle assembly mounted to the frame at a location behind the primary axle assembly, the secondary axle assembly comprising a secondary axle having opposite ends to which secondary chain wheels are mounted, the primary axle assembly comprising a primary axle having opposite ends to which pedal cranks are mounted, each pedal cranks being provided with a one-way bearing to couple with the primary axle, a primary chain wheel being mounted to the primary axle to drive a rear hub, driving collars and clutching rings being axially mounted on the primary axle and controlled by a control mechanism, the control mechanism comprising:

an engaging fork, which is in driving engagement with a respective one of the driving collars, a connector connected to each of the engaging forks with a wire and further connected to a manually operable pull wire by a spring, the engaging forks being rotatably mounted to the frame; and a secondary control block, which is selectively engageable a respective one of the clutching rings by a biasing force, whereby in condition where the engagement is established between a first tooth of the secondary control block and a second tooth of said respective one of the clutching rings, when the secondary control block is set in reversed rotation, a camming force acting between an inclination between the first and second teeth separates the secondary control block and said respective one of the clutching rings to effect idling rotation of the secondary control block.

2. The multifunctional pedaling motion bicycle as claimed in claim 1, further comprising a primary control block engageable by a respective one of the clutching rings to transmit pedaling force from the pedal crank to the rear hub.

3. The multifunctional pedaling motion bicycle as claimed in claim 1, wherein each of the driving collars is coupled to a respective one of the clutching rings and wherein said respective one of the clutching rings is driven by said each of the driving collars to move between the secondary control block and a primary control block.

4. The multifunctional pedaling motion bicycle as claimed in claim 1, wherein the connector is connected to each of the engaging forks by a wire that is fixed to a connection member rotatably fixed to the engaging fork and wherein the engaging forks are rotatably attached to a base that is fixed to the frame, whereby pulling/releasing the pull wire allows the engaging forks to move toward/away from each other and thus respectively moving the clutching rings between the secondary control blocks and primary control blocks.

5. A multifunctional pedaling motion bicycle comprising:
a crank shaft adapted to rotatably mount to a frame of the bicycle and having two axial ends to which two cranks are attached by one-way bearings to allow driving coupling to form between the cranks and the crank shaft in a given rotational direction and breaking the driving coupling when the cranks rotated in an opposite rotational direction;
two primary control blocks rotatably fixed to the crank shaft;
two secondary control blocks rotatably mounted to the crank shaft and axially and respectively spaced from the primary control blocks by predetermined distances, the secondary control blocks being in operative coupling with an angle limiter;
clutching rings rotatably and respectively fixed to the cranks and axially movable with respect to the crank shaft between first and second extreme positions to selectively and respectively engage the primary control blocks and the secondary control blocks for effecting first and second operation modes, respectively;
wherein the engagement between the secondary control blocks and the clutching rings comprises control-block side teeth that are circumferentially spaced and clutching-ring side teeth that are circumferentially spaced and corresponding to the control-block side teeth in angular positions whereby the control-block side teeth and the clutching ring side teeth are engageable with each other when the clutching rings are at the second position;
wherein at least one of the clutching-ring side teeth and the control-block side teeth comprises a camming inclination formed on an end thereof to engage the other one of the clutching-ring side teeth and the control-block side teeth, and wherein the clutching rings are spring biased toward the secondary control blocks respectively to form the engagement between the control-block side teeth and the clutching ring side teeth, the engagement is breakable by an external torque acting between each of the secondary control blocks and the respective one of the clutching rings and inducing an axial separation force between the secondary control block and the clutching ring due to the camming inclination:
wherein in the first operation mode, the cranks are locked to the crank shaft in the opposite rotational direction by the engagement between the clutching rings and the primary control blocks, whereby the cranks are allowed to do continuous rotation in both the given direction and the opposite direction, and
wherein in the second operation mode, the cranks are coupled to the angle limiter to perform reciprocal rotation within an angular range set by the angle limiter.

6. The multifunctional pedaling motion bicycle as claimed in claim 5, wherein each of the clutching rings is axially positionable at an intermediate position between the extreme positions, whereby the clutching rings disengage from both the primary and the secondary control blocks to allow independent rotation of the cranks with respect to each other.

* * * * *